Figure 1:
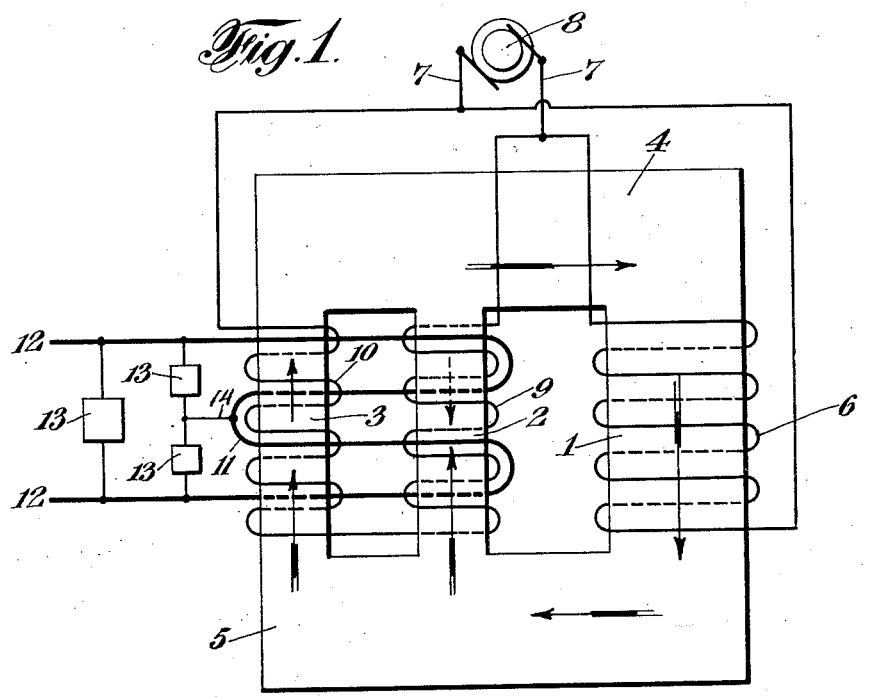

June 30, 1931. H. K. KOUYOUMJIAN 1,812,299
ELECTRIC CONTROLLING APPARATUS
Filed Sept. 15, 1928 3 Sheets-Sheet 1

INVENTOR.
Harutiun K. Kouyoumjian
BY
Edwards, Sager + Bower.
ATTORNEYS.

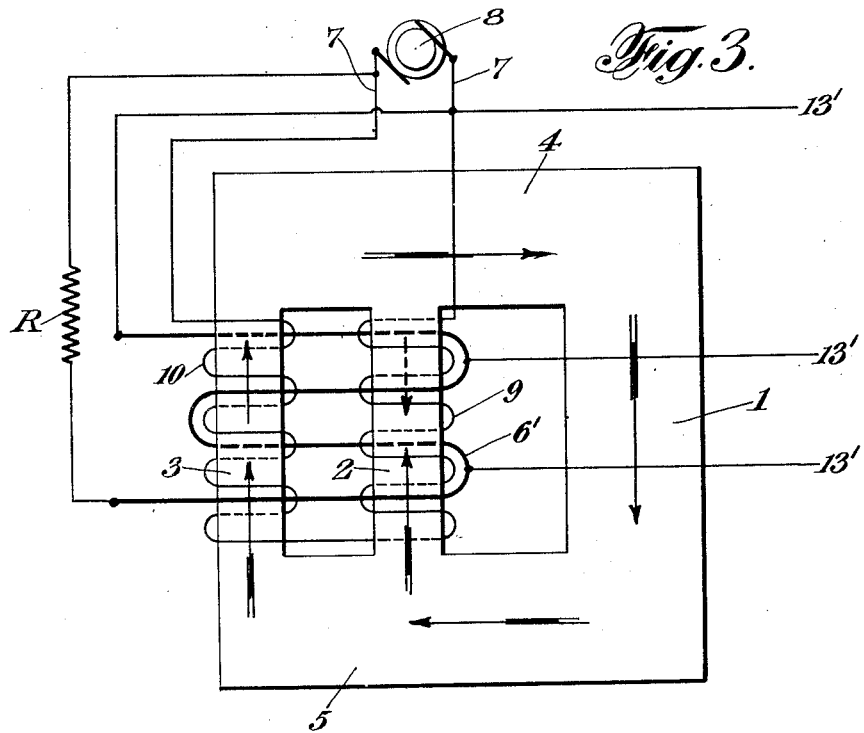
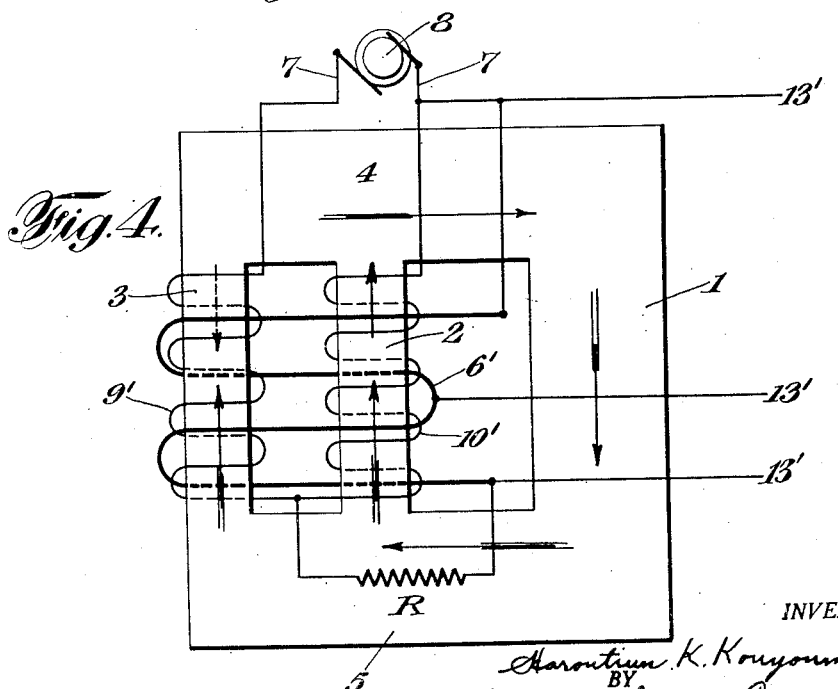

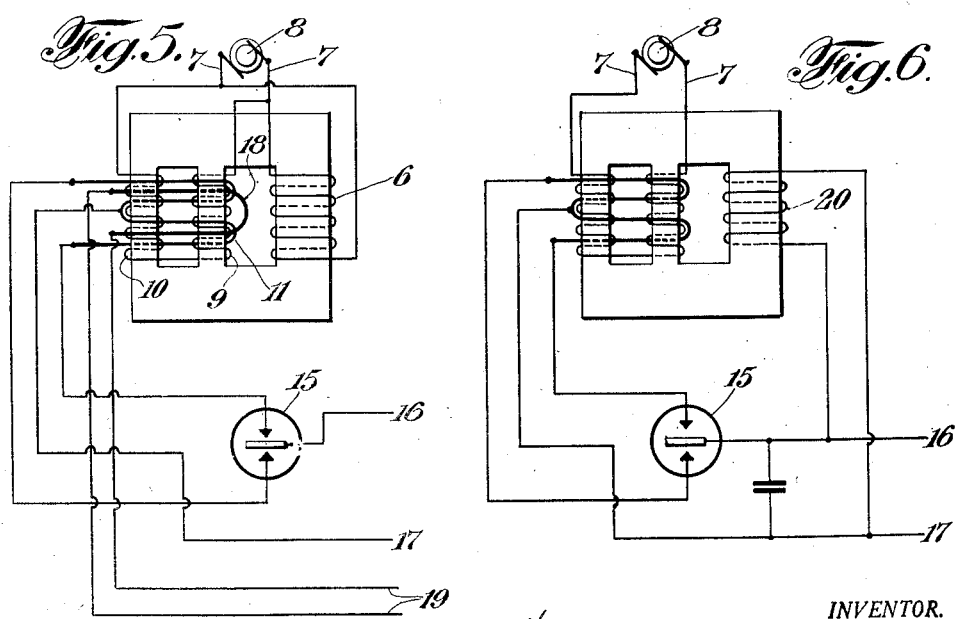

Patented June 30, 1931

1,812,299

UNITED STATES PATENT OFFICE

HAROUTIUN K. KOUYOUMJIAN, OF PROVIDENCE, RHODE ISLAND, ASSIGNOR TO WARD LEONARD ELECTRIC COMPANY, A CORPORATION OF NEW YORK

ELECTRIC CONTROLLING APPARATUS

Application filed September 15, 1928. Serial No. 306,259.

This invention relates to improved controlling apparatus for regulating the voltage, where energy is derived from an alternating current source subject to variations in the voltage supplied, or in the frequency, or both, and wherein the derived voltage is maintained substantially constant irrespective of the variations in the supply. The invention also relates to obtaining any desired control of the output voltage where the supply voltage varies. For example, with an increase in supply voltage, the output voltage may be caused to decrease in a predetermined amount; or with an increase in supply voltage, the output voltage may be caused to increase in a predetermined amount; or with an increase in supply voltage, a predetermined successive increase and decrease, or vice versa, may be caused to occur, or any desired results may be secured by relative proportioning of the parts.

The main object is to provide a form of apparatus which may be simple in character and in low cost of construction, and adapted to be introduced in the alternating current circuit as a unit for securing automatic control of the voltage delivered and adapted for general use. The improved apparatus is adapted to be interpolated in an alternating current circuit between the source and the translating device, or translating devices, and maintain the required voltage substantially constant and avoids the use of auxiliary controlling means. It is not only adapted for use where the required voltage is the same in general as that of the supply voltage, but is particularly well adapted for instances where the required derived voltage is materially different from that of the supply lines, such for example, as for supplying required substantially constant alternating current voltage to the power unit of a radio receiving set where the voltage is stepped down from that of the supply voltage, which latter may ordinarily be about 110 volts. This invention not only serves to maintain the derived alternating current voltage substantially constant, but also serves as a transformer and avoids the use of an additional transformer where the required voltage is to be transformed from that of the available supply. The invention thus combines in one unit the functions of a transformer and voltage regulator with resulting simplicity and reduced cost of apparatus, as well as attaining high efficiency in operation.

This invention also permits the use of a simple form of core structure and windings adapted to be conveniently made and assembled at low cost. Other objects and advantages will be apparent to those skilled in the art from the following description and accompanying drawings; likewise, it will be appreciated that the invention is applicable to various uses and capable of modification in design and construction to meet particular requirements.

Figure 2:
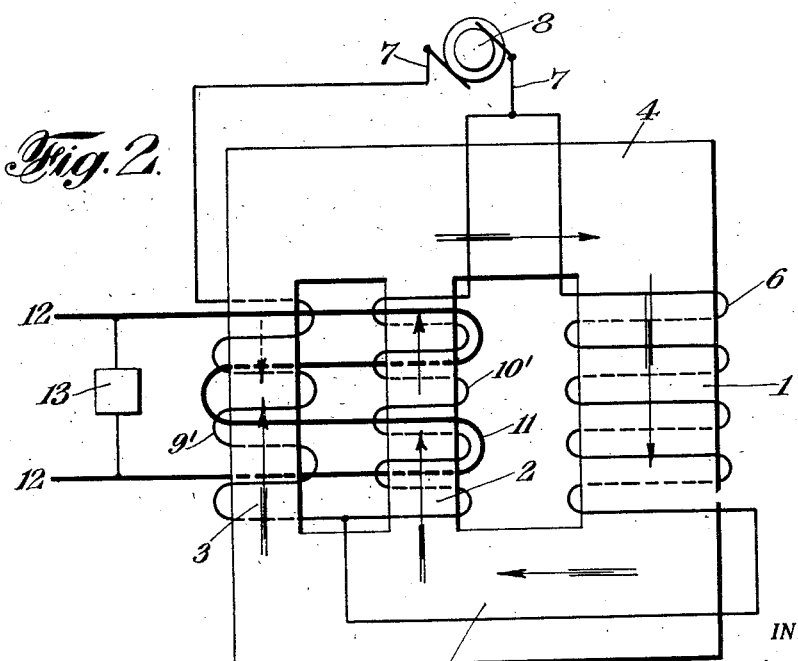

Fig. 1 is a diagram illustrating one embodiment of this invention generally applicable for maintaining the required alternating current substantially constant and for likewise transforming the voltage of the source to any required voltage; Fig. 2 is a diagram similar to Fig. 1 showing a modification in which the connections and relationship of the parts are modified; Fig. 3 is a diagram of another modification wherein a diagram of another modification wherein the output winding forms part of the main primary or exciting winding; Fig. 4 is a diagram similar to Fig. 3 modified as to certain features; Fig. 5 is a diagram showing an embodiment of the invention adapted to control and deliver the required B supply for a radio receiving set and likewise, if desired, the A supply where the set is adapted to receive alternating current filament voltage; and Fig. 6 is a diagram of a modification where one of the windings of the controlling unit is supplied by direct current voltage instead of alternating.

Referring to Fig. 1, the core of the controller is laminated in the usual manner, and in the present instance is indicated as having all its laminæ in parallel planes and comprises three parallel legs 1, 2 and 3 connected together by an upper crosspiece 4 and a lower crosspiece 5. One of the outer legs 1 is the main leg and is adapted to carry substantially all of the main flux of the regulator, as is likewise the case with the main portions of the crosspieces 4 and 5. The middle leg 2 and the outer leg 3 are spaced from each other to receive individual windings and are spaced from the leg 1 to permit the application of a common winding around both legs 2 and 3 and to also permit a winding around leg 1. In the present instance, and for the usual case, the cross-section of the legs 2 and 3 is about the same for each of these legs, which cross-section is about half that of the leg 1.

The main leg 1 is enveloped by an alternating current winding 6 connected in parallel to the alternating current supply lines 7, 7 and alternating current source 8. Around the leg 2 is an alternating current winding 9 connected in series with another winding 10 around the leg 3 and connected to the supply lines 7, 7. In some instances the windings 9 and 10 may be connected in parallel with each other to the alternating current source. The direction of the windings 9 and 10 with reference to each other is such as to act cumulatively with reference to excitation of the legs 2 and 3; consequently, the direction of magnetic flux due to the windings 9 and 10 will be additive to the flux due to winding 6 in one of the legs and subtractive or in opposition with reference to the winding 6 as to the other of the two legs. For the purpose of more readily understanding the invention, it is assumed in one instant of operation that the direction and path of flux due to winding 6 is indicated by the full line arrows; and the direction of the flux due to winding 10 is also indicated by the full line arrows, whereas the direction of flux due to winding 9 is indicated by the dotted line arrow and is seen as being in opposition to the main flux, as indicated particularly in the leg 2.

The output winding 11 envelopes both of the legs 2 and 3 and supplies the output circuit 12 and any desired translating device represented at 13. The winding 11 may be supplied with taps as indicated at 14 for the purpose of supplying any required voltage less in amount than the full voltage of the winding 11. The various windings may be given such size and number of turns and the core proportioned according to the particular requirements; and it will be understood that the number of turns indicated in the drawings are for the purpose of simplicity and clearness. It will also be understood that the windings instead of being superimposed may be placed side by side on the legs 2 and 3, or may be relatively sandwiched between each other in accordance with usual practice where the particular conditions deem it advisable. The number of ampere turns of windings 9 and 10 on the legs 2 and 3 and the cross-section of the legs 2 and 3 are so related that under normal conditions these cores are worked near or just below the knee of the saturation curve, although in some cases for particular requirements these cores may be worked at a different part of the saturation curve. It will also be understood that the output winding 11 may, in some cases, be located upon other parts of the core instead of embracing the two legs 2, 3 and windings thereon, but the output windings should preferably be subjected to the total resultant flux of the core for the purposes herein described.

In order to understand the operation, we may assume the direction of the flux at a particular instant to be as indicated by the arrows in Fig. 1, the flux due to winding 10 in leg 3 being additive to the main flux due to winding 6; and the flux in leg 2 due to winding 9 being in opposition thereto. Assuming the normal supply voltage to be 110 volts, the condition of a change to an abnormally low voltage of say 90 may be considered. The flux in the legs 2 and 3 is then on the straight portion of the permeability curve, or below the knee of the curve, and it may be considered that the flux added to the leg 3 due to winding 10 is equal to the flux deducted from the leg 2 due to the winding 9, thus permitting the main flux due to the main winding 6 to have a substantially full and unmodified resultant effect. Now assume that the supply voltage be increased from 90 to the abnormally high voltage of 120. This, of course, tends to increase the total main flux due to the increased excitation or increase of ampere turns in windings 6 and 10, but the increase due to the added effect of winding 10 is not proportional, because the increased flux in the leg 3 causes the excitation of the same to be such that it is carried along the bend or knee of the saturation or permeability curve. The excitation due to winding 9, however, gives increasing opposition to the main flux, and as the leg 2 is then worked along the straight portion of the permeability curve, its opposition is more effective on the main flux than is the attempted added effect due to the winding 10. Thus the resultant effect on the main flux is to tend to prevent any objectionable increase and to prevent any increase in the voltage delivered by the output winding 11, which is in any way comparable to the extreme increase in the supply voltage. In other words, regardless of variations in the alternating current supply, the alternating current output is maintained substantially constant because the main flux in the core is maintained substantially constant, due to the legs 2 and 3 being worked on different portions of the permeability curve and having varying relative effects upon the total flux in accordance with changes in the supply voltage. The action of the controller is also such that it will maintain the voltage substantially constant, even when change in the frequency of the supply occurs; or, by suitably proportioning the parts, may cause the output voltage to change as desired upon change of frequency.

In some cases, the winding and leg opposing the main flux may be made an outer leg instead of the intermediate leg, as shown in the drawings, with substantially the same results. Also, the main exciting or primary winding 6, instead of being connected directly across the supply lines, may be connected in series across the supply lines through the opposing winding 9 and in parallel with the cumulatively acting winding 10. In such a case, the ampere turns of the opposing winding 9 should be made such, for best results in maintaining constant regulation, as to equal the ampere turns of the cumulatively acting winding under normal conditions. This form of connection has the advantage that upon increase in the supply voltage above normal, the tendency is to reduce the wattless current in the main winding. This, of course, results in improving the regulation, because less wattless current means less primary ampere turns and less flux which the bucking winding must overcome. A further advantage results in permitting the bucking winding to be made with fewer turns. A further advantage results from the fact that by reason of the core of the bucking winding being less saturated than the core of the primary winding, an increase in the input voltage will produce a greater proportionate reactance drop on the bucking winding than on the primary winding. As a result, an increase in input voltage produces a lesser increase on the primary winding than would be the case if the primary reactance increased proportionally to the bucking coil reactance. This lesser proportionate change of supply voltage in affecting the primary winding requires a correspondingly less amount of regulation in giving the desired results. This modification is shown in Fig. 2 wherein the opposing winding 9' is shown located on an outer leg of the core and the cumulatively acting winding 10' is shown on the inner leg. Also, the main primary winding 6 is shown in Fig. 2 as connected in series across the line with the winding 9', the winding 9' being diagrammatically indicated as having a lesser number of turns than the winding 10' as above explained.

In the form shown in Fig. 3, the parts correspondingly numbered are the same as in Fig. 1, but the main primary winding and the output winding are united into a common winding 6'. This form may be termed an auto-transformer type where the primary winding, or a part thereof, serves also as the secondary or output winding. Any desired voltage for the output circuit lines 13' may be obtained by tap connections to the winding 6', as indicated in Fig. 3, according to the output voltage desired. The resistance R is inserted in series with the winding 6' across the supply lines, in order to prevent excessive current flow under conditions of abnormally high supply voltage. In the modification shown in Fig. 3, the mode of operation is similar to that already described with reference to Fig. 1.

The form shown in Fig. 4 generally corresponds with that shown in Fig. 3, except that the main winding 6' is connected in series across the supply lines through the opposing winding 9' (shown on the left-hand leg) and through the resistance R. Here the number of ampere turns of the winding 9' would be less than that of the ampere turns of the winding 10', this form corresponding generally to that of Fig. 3, except modified as to the connection of the main winding 6' to correspond in general with the form of series connection described with reference to Fig. 2, the output lines 13' of Fig. 4 being connected to the main winding 6' to secure any desired output voltages.

In the form shown in Fig. 5, the parts correspondingly numbered are the same as in Fig. 1, but here the output winding 11 is shown as supplying its alternating current to a full wave rectifier 15, from which one of the direct current supply wires 16 extends, the other direct current supply wire 17 being connected to a mid tap in the winding 11, this form being adapted to maintain the alternating voltage supplied to the rectifier as substantially constant, regardless of variations in the alternating current voltage supply, and is also adapted for controlling at constant voltage the B supply to a radio receiving set. For alternating current receiving sets, the required A. C. voltages may be obtained from taps on the winding 11, or by the use of additional secondary windings corresponding to the winding 11. One such additional output winding is indicated by the reference character 18, the circuit 19 therefrom being adapted to supply the filaments of alternating current tubes. The output windings 18 or 11 may, if desired, be located on other parts of the core, provided it is sufficiently subjected to the total resultant flux of the core.

In the form shown in Fig. 6, the parts correspond generally with those described with reference to Fig. 5, except that the winding 6 of Figs. 1 and 5 becomes a direct current winding 20, being connected across the direct current wires 16 and 17. Here the operation is generally the same as that already described with reference to Fig. 1 as regards control of the output voltage under varying conditions of the alternating current supply voltage. This modification may be desired in some cases, but for general use, the forms of controller shown in the other figures are preferable, as they may be introduced in the alternating current circuit and used externally with reference to the translating devices supplied from the output circuit of the controller.

It will be understood that my improved apparatus may be operated in the reverse manner to that described, that is, if energy of variable voltage be supplied to the secondary or output winding, the exciting windings will then deliver current with the voltage controlled within limits. Such a reversal of operation will not, however, be as efficient, or secure as desirable results, as when the apparatus is operated in the normal manner.

It will be evident to those skilled in the art that the invention may be embodied in various forms of apparatus and various modifications may be made therein without departing from the scope thereof.

I claim:

1. An alternating current controlling apparatus comprising a core having three legs, a main exciting winding on one of said legs, a primary alternating current winding on each of the other two legs respectively, one of said alternating current windings tending to create a flux in opposition to the flux created by said main winding, and the other alternating current winding acting cumulatively with said main winding, and an output winding around the two legs of the core having the said alternating current windings thereon.

2. An alternating current controlling apparatus comprising a core having three legs, a main exciting winding on one of said legs, a primary alternating current winding on each of the other two legs respectively, one of said alternating current windings tending to create a flux in opposition to the flux created by said main winding, and the other alternating current winding acting cumulatively with said main winding, and an output winding round the two legs of the core having the said alternating current windings thereon, each of the legs having the alternating current windings being of less cross-section than that of the leg carrying the main winding.

3. An alternating current controlling apparatus comprising a core having three legs, a main alternating current exciting winding on one of said legs, a primary alternating current winding on each of the other two legs respectively, one of said latter alternating current windings tending to create a flux in opposition to the flux created by said main winding, and the other alternating current winding acting cumulatively with said main winding, and an output winding around the two legs of the core having the said alternating current windings thereon, the leg having the cumulatively acting alternating current winding being adapted to be worked near the knee of the permeability curve.

4. An alternating current controlling apparatus comprising a core having three legs, a main alternating current exciting winding on one of said legs, a primary alternating current winding on each of the other two legs respectively, one of said alternating current windings tending to create a flux in opposition to the flux created by said main winding, and the other alternating current winding acting cumulatively with said main winding, and an output winding around the two legs of the core having the said second-named alternating current windings thereon.

5. An alternating current controlling apparatus comprising a core having parts displaced from each other, means comprising a main alternating current exciting winding for causing one of said parts of the core to be substantially saturated, an alternating current exciting winding embracing another of said parts acting in opposition to said first-named winding, and an output winding embracing both of said parts.

6. An alternating current controlling apparatus comprising a core having parts displaced from each other, means comprising a main alternating current exciting winding for causing one of said parts of the core to be substantially saturated, an alternating current exciting winding embracing another of said parts acting in opposition to said first-named winding, said last-named part of the core being below saturation, and an output winding embracing both of said parts.

7. An alternating current controlling apparatus comprising a core having parts displaced from each other, means comprising a main alternating current exciting winding for causing one of said parts of the core to be substantially saturated, an alternating current exciting winding embracing another of said parts acting in opposition to said first-named winding, said last-named part of the core being below saturation, and an output circuit subjected to the combined magnetic opposing effects of said windings.

8. An alternating current controlling apparatus comprising a core, an alternating current exciting winding thereon, a second alternating current exciting winding on a portion of said core acting cumulatively with said first-named winding, said portion of the core being substantially saturated, a third alternating current exciting winding on another portion of said core acting in opposition to at least one of said two first-named windings, said last-named portion of the core being below saturation, and an output circuit delivering energy dependent upon the combined magnetic effect of said three windings.

9. An alternating current controlling apparatus comprising a core having parts displaced from each other, an alternating current exciting winding for producing the main flux in the core, an alternating current exciting winding embracing one of said parts acting in opposition to said first-named winding, said first-named winding being in series with at least a portion of said opposing winding, and an output winding embracing said last named part and a second part of the core.

10. An alternating current controlling apparatus comprising a core having parts displaced from each other, means comprising a main alternating current exciting winding for causing one of said parts of the core to be substantially saturated, an alternating current exciting winding embracing another of said parts acting in opposition to said first-named winding, said last-named part of the core being below saturation, said first-named winding being in series with at least a portion of said opposing winding, and an output circuit subjected to the combined magnetic opposing effects of said windings.

11. An alternating current controlling apparatus comprising a core, a main alternating current exciting winding thereon, a second alternating current exciting winding on a portion of the core acting cumulatively with said main winding, said portion of the core being substantially saturated, a third alternating current exciting winding on another portion of said core acting in opposition to said main winding, said last-named portion of the core being below saturation, said main winding being connected in series with at least a portion of said opposing winding, and an output circuit delivering energy dependent upon the combined magnetic effect of said three windings.

12. An alternating current controlling apparatus comprising a core having three parallel legs in the same plane joined by cross-pieces at their ends, a main alternating current exciting winding on one of the legs, a second alternating current exciting winding on one of the other legs acting cumulatively with said main winding, a third alternating current exciting winding on the remaining leg acting in opposition to said main winding, said main winding being connected in series with at least a portion of said opposing winding, and an output winding embracing the last two named legs of the core.

13. An alternating current controlling apparatus comprising a core having at least three legs, alternating current exciting windings on each of said legs respectively, one of said windings being a main winding for producing the main flux of the core, one of said windings tending to create a flux in opposition to that created by said main winding and embracing a portion of the core in the path of a portion of the main flux of the core, and an output circuit delivering energy dependent upon the combined magnetic effect of said three windings.

14. An alternating current controlling apparatus comprising a core having three legs, a main exciting winding on one of said legs, a primary alternating current winding on each of the other two legs respectively, one of said alternating current windings tending to create a flux in opposition to the flux created by said main winding and embracing a portion of the core in the path of the main flux of the core, and the other alternating current winding acting cumulatively with said main winding, and an output winding subjected to resultant flux in the core.

15. An alternating current controlling apparatus comprising a core having three legs, a main alternating current exciting winding on one of said legs, a primary alternating current winding on each of the other two legs respectively, one of said alternating current windings tending to create a flux in opposition to the flux created by said main winding, and the other alternating current winding acting cumulatively with said main winding, and an output winding subjected to resultant flux in the core and embracing a portion of the core which is likewise embraced by said opposing winding.

16. An alternating current controlling apparatus comprising a core, a main alternating current exciting winding thereon for producing the main flux of the core, a second alternating current exciting winding on a portion of said core acting cumulatively with said first-named winding, a third alternating current exciting winding on another portion of said core acting in opposition to said main winding and embracing a portion of the core in the path of a portion of the main flux of the core, and an output circuit delivering energy dependent upon the combined magnetic effect of said three windings.

17. An alternating current controlling apparatus comprising a core, a main alternating current exciting winding thereon for producing the main flux of the core, a second alternating current exciting winding on a portion of said core acting cumulatively with said first-named winding, a third alternating current exciting winding on another portion of said core acting in opposition to said main winding and embracing a portion of the core in the path of a portion of the main flux of the core, each of said three windings being excited by energy derived from the same source of alternating current, and an output circuit delivering energy dependent upon the combined magnetic effect of said three windings.

18. The combination with a single phase source of alternating current energy of an alternating current controlling apparatus comprising a core having parts displaced from each other, a main alternating current exciting winding connected to said source for producing the main flux of the core, an alternating current exciting winding connected to said source and embracing one of said parts in the path of the main flux and acting in opposition to said first-named winding, a second part of the core being in the path of a portion of the main flux, and an output winding embracing both of said parts.

19. An alternating current controlling apparatus comprising a core having parts displaced from each other, an alternating current exciting winding embracing one of said parts for creating a main flux in the core, an alternating current exciting winding embracing another of said parts acting in opposition to said first-named winding and embracing a portion of the core in the path of a portion of the main flux of the core, and an output winding subjected to the main flux and also to the combined magnetic opposing effects of said windings.

20. The combination with a single phase source of alternating current energy of an alternating current controlling apparatus comprising a core having at least three parts displaced from each other, a main alternating current exciting winding connected to said source and embracing one of said parts, an alternating current exciting winding connected to said source and embracing another of said parts acting in opposition to said first-named winding, said last-named part of the core being below saturation, and an output winding embracing two of said parts.

21. An alternating current controlling apparatus comprising a core having at least three parts displaced from each other, a main alternating current exciting winding embracing one of said parts and producing the main flux of the core, an alternating current exciting winding embracing another of said parts acting in opposition to said first-named winding and embracing a portion of the core in the path of a portion of the main flux of the core, said last-named part of the core being below saturation, and an output winding subjected to the main flux and also to the combined magnetic opposing effects of said windings.

22. An alternating current controlling apparatus comprising a core having at least three parts displaced from each other, means comprising a main alternating current exciting winding for producing the main flux of the core and for causing one of said parts of the core to be substantially saturated, an alternating current exciting winding embracing another of said parts acting in opposition to said first-named winding and embracing a portion of the core in the path of a portion of the main flux of the core, and an output winding subjected to the main flux and also to the combined magnetic opposing effects of said windings.

23. An alternating current controlling apparatus comprising a core, an alternating current exciting winding thereon for producing the main flux of the core, a second alternating current exciting winding on a portion of said core acting cumulatively with said first-named winding, a third alternating current exciting winding on another portion of said core in the path of a portion of the main flux of the core acting in opposition to said first named winding, said last-named portion of said core being below saturation, and an output circuit delivering energy dependent upon the combined magnetic effect of said three windings.

24. An alternating current controlling apparatus comprising a core having at least three parts displaced from each other, a main alternating current exciting winding embracing one of said parts for producing the main flux of the core, an alternating current exciting winding embracing another of said parts in the path of a portion of the main flux of the core acting in opposition to said first-named winding, said first-named winding being in series with at least a portion of said opposing winding, and an output winding subjected to the main flux and also to the combined magnetic opposing effects of said windings.

25. An alternating current controlling apparatus comprising a core having at least three parts displaced from each other, a main alternating current exciting winding embracing one of said parts for producing the main flux of the core, an alternating current exciting winding embracing another of said parts in the path of a portion of the main flux of the core acting in opposition to said first-named winding, said last-named part of the core being below saturation, said first-named winding being in series with at least a portion of said opposing winding, and an output winding subjected to the main flux and also to the combined magnetic opposing effects of said windings.

26. An alternating current controlling apparatus comprising a core, a main alternating current exciting winding thereon, a second alternating current exciting winding on a portion of the core acting cumulatively with said main winding, a third alternating current exciting winding on another portion of said core in the path of a portion of the main flux of the core acting in opposition to said main winding. said main winding being connected in series with at least a portion of said opposing winding, and an output circuit delivering energy dependent upon the combined magnetic effect of said three windings.

27. An alternating current controlling apparatus comprising a core, a main alternating current exciting winding thereon, a second alternating current exciting winding on a portion of the core acting cumulatively with said main winding, a third alternating current exciting winding on another portion of said core in the path of a portion of the main flux of the core acting in opposition to said main winding, said last-named portion of the core being below saturation, said main winding being connected in series with at least a portion of said opposing winding, and an output circuit delivering energy dependent upon the combined magnetic effect of said three windings.

HAROUTIUN K. KOUYOUMJIAN.